United States Patent [19]

Langford et al.

[11] Patent Number: 4,806,514

[45] Date of Patent: Feb. 21, 1989

[54] COMPOSITE PHOTOCATALYST FOR REFRACTORY WASTE DEGRADATION

[75] Inventors: Cooper H. Langford, Lac Guindon, Canada; Mark K. S. Mak, Kowloon, Hong Kong; Andrew M. Crouch, Cape Town, South Africa

[73] Assignee: Canadian Patents and Development Limited -Societe Canadienne des Brevets et D'Exploitation Limitee, Canada

[21] Appl. No.: 103,024

[22] Filed: Sep. 30, 1987

[30] Foreign Application Priority Data

Oct. 2, 1986 [CA] Canada ................................... 519650

[51] Int. Cl.$^4$ ............................................. B01J 31/22
[52] U.S. Cl. .................................... 502/159; 502/163; 204/158.21
[58] Field of Search ................................ 502/159, 163

[56] References Cited

U.S. PATENT DOCUMENTS

| | | | |
|---|---|---|---|
| 3,396,123 | 8/1968 | Urban | 502/163 X |
| 4,298,502 | 11/1981 | Carlson | 502/163 X |
| 4,565,799 | 1/1986 | Giordano et al. | 502/163 X |
| 4,579,837 | 4/1986 | Busch et al. | 502/159 X |

FOREIGN PATENT DOCUMENTS 0193974  9/1986  European Pat. Off. ............ 502/163
57-166175 10/1982  Japan .

OTHER PUBLICATIONS

John H. Carey and Barry G. Oliver, *Water Poll. Res. J. of Canada*, vol. 15, No. 2, 1980, pp. 157–185.
Cooper H. Langford et al., *Catalysis on the Energy Scene*, Elsevier Science Publishers B.V., Amsterdam, 1984, pp. 291–296.

*Primary Examiner*—Patrick P. Garvin
*Attorney, Agent, or Firm*—Foley & Lardner, Schwartz, Jeffery, Schwaab, Mack, Blumenthal & Evans

[57] ABSTRACT

A composite photocatalyst for refractory waste treatment comprising particles of a wide band gap semiconductor material selected from the group consisting of titanium oxide, cadmium sulfide and cadmium selenide, the particles being coated with a polymer film capable of absorbing a refractory waste substrate to be treated and comprising a pyridine-containing polymer and a divalent metal porphyrin or phthalocyanine-based dye. The dye is molecularly dispersed throughout the film and chemically bonded to the pyridine-containing polymer. Upon mixing of the photocatalyst with the refractory waste substrate and irradiation with light having a wavelength of about 300 to about 400 nm, the photocatalyst of the invention generates in the polymer film thereof reactive species which are sufficiently oxidizing to degrade the refractory waste substrate absorbed in the polymer film.

9 Claims, 1 Drawing Sheet

COMPOSITE PHOTOCATALYST FOR REFRACTORY WASTE DEGRADATION

BACKGROUND OF THE INVENTION

The present invention relates to a composite photocatalyst for the photochemical degradation of refractory waste materials and to a method of using the photocatalyst for treating refractory waste materials which are known to withstand high temperature oxidation, such as chlorinated aromatic compounds and metal cyanide complexes, to degrade same. The invention is particularly directed to the detoxification of PCB's (polychlorinated biphenyls).

Previous reports have described the dechlorination of PCB's involving a photocatalytic process using titanium dioxide. The scope of the potential for photocatalysis in waste treatment was reported in a paper by Carey and Oliver, *Water Poll. Res. J. of Canada*, Vol. 15, No. 2, 1980, pp. 157–185. In this report, the authors were able to demonstrate laboratory potential for all of the following reactions using titanium dioxide:

1. Oxidation of cyanide.
2. Decoloration of pulp mill black liquors.
3. Dechlorination of chlorobezoate to benzoate.
4. Increase of biodegradability of a lignin model.
5. Detoxification of AROCLOR 1254 (trademark; a polychlorinated biphenyl).

Titanium dioxide has been the most popular of metal oxide semiconductors for study of photocatalysis for nearly 50 years. It has a band gap of 3.2 eV and absorbes light starting from 350 nm and continuing toward higher energy. Consequently, there has been continuing interest in methods for the sensitization of titanium dioxide to allow use of longer wavelength.

Japanese Patent Publication No. 57-166,175, for example, describes the use of titanium dioxide with 5% platinum deposited thereon as a photocatalyst for decomposing PCB's under visible and ultraviolet light. Such a photocatalyst, however, is effective for all practical purposes on PCB in water only, and not on PCB in oil, the more normally encountered form of PCB waste.

SUMMARY OF THE INVENTION

It is therefore an object of the present invention to overcome the above drawback and to provide a composite photocatalyst for the photochemical degradation of refractory waste materials such as PCB's, which photocatalyst has increased reactivity and is capable of efficiently degrading the refractory waste when in an organic phase rather than in water.

In accordance with the invention, there is provided a composite photocatalyst for refractory waste treatment, comprising particles of a wide band gap semiconductor material selected from the group consisting of titanium dioxide, cadium sulfide and cadmium selenide, the particle being coated with a polymer film capable of absorbing a refractory waste substrate to be treated and comprising a pyridine-containing polymer and a divalent metal porphyrin- or phthalocyanine-based dye. The dye is molecularly dispersed throughout the film and chemically bonded to the pyridine-containing polymer. Upon mixing of the photocatalyst with the refractory waste substrate and irradiation with light having a wavelength of about 300 to about 400 nm, the photocatalyst of the invention generates in the polymer film thereof reactive species which are sufficiently oxidizing to degrade the refractory waste substrate absorbed in the polymer film.

The present invention also provides, in another aspect thereof, a method of photochemically degrading a refractory waste substrate, which comprises the steps of:

(a) dispersing particles of a composite photocatalyst as defined above in a polar liquid medium to form a slurry of the photocatalyst particles;

(b) mixing the slurry of photocatalyst particles obtained in step (a) with the refractory waste substrate; and (c) irradiating the mixture of substrate and slurry of photocatalyst particles under agitation with light having a wavelength of about 300 to about 400 nm to cause degradation of the refractory waste substrate.

The development of a photocatalyst for practical applications such as the detoxification of PCB waste involves three aspects. First, a catalyst must be effective for initiating, photochemically, the desired reactions by generation of reactive species. Thus, the reactive species must somehow be prevented from undergoing undesirable recombination. Second, the catalyst must be stable and fabricated from relatively inexpensive materials. Third, it must absorb light over a useful region of the spectrum.

The composite photocatalyst according to the invention meets all of the above requirements. Indeed, it has been observed that the photoreaction is initiated by hole scavenging of the porphyrin or phthalocyanine dye to produce the strongly oxidizing cation radical of the porphyrin or phthalocyanine. Hole-electron recombination is prevented by the semiconductor providing a potential gradient across the space charge layer between the dye and the semiconductor, so that long lived reactive species, i.e. highly oxidizing porphyrin and phthalocyanine radicals, are produced. It would appear that the electron from the dye would be attracted to and be trapped in localized doping sites of the semiconductor. Thus, the semiconductor would play the role to render the photoreaction irreversible.

The presence of pyridine groups in the polymer film is also essential since pyridine has been found to substantially increase the reactivity of the oxidized porphyrin or phthalocyanine. The catalysis of reactions of substrates difficult to oxidize such as PCB's and metal cyanide complexes would depend upon efficient charge transfer between the dye excited under blue or ultraviolet light and the semiconductor via the pyridine groups of the polymer film.

The wide band gap semiconductor materials which can be used in accordance with the invention are titanium dioxide ($TiO_2$), cadmium sulfide (CdS) and cadmium selenide (CdSe). These materials are readily available at low cost, are stable under light and are non-toxic. They preferably have a particle size ranging from about 1 to about 10$\mu$. Ferric oxide ($Fe_2O_3$) and cadmium telluride (CdTe), on the other hand, which are also wide band gap semiconductors, are not effective to provide the desired photocatalyst and are thus inoperative in the context of the present invention.

Coated over the semiconductor material is a polymer film comprising a pyridine-containing polymer, such as polyvinylpyridine. The polymer may be a polymer blend involving for example the co-polymerisation of polyvinylpyridine with styrene to control the substrate absorption and hydrophobicity of the film and/or the mixing of the polyvinylpyridine with a cationic ionomer to allow the incorporation of electrolytes in the film. The polymer film generally has a thickness ranging from about 0.5 to about 2µ, preferably 1µ.

Examples of suitable divalent metal porphyrin and phthalocyanine dyes which can be incorporated into the polymer film include zinc, palladium and magnesium tetraphenylporphyrins and copper phthalocyanine. The dye must contain a divalent metal for stability, with or without ionic groups such as sulfonates on the periphery of the organic ring.

According to a particularly preferred embodiment, the polymer film comprises polyvinylpyridine or a copolymer of vinylpyridine with styrene and zinc tetraphenylporphyrin in a zinc to pyridine mole ratio greater than 1:8, preferably in a ratio of about 1:6. A photocatalyst with such a film is especially suited for the dechlorination of mixed polychlorinated biphenyls such as AROCLOR 1254 to release ionic chloride. The PCB's may be dissolved in an organic phase while the photocatalyst is slurried in a polar liquid medium, such as water, methanol or acetonitrile, the sample then being stirred with the catalyst slurry and irradiated with light in the 300-400 nm range.

According to another preferred embodiment, the polymer film comprises polyvinylpyridine or a copolymer of vinylpyridine with styrene blended with a cationic ionomer of the formula:

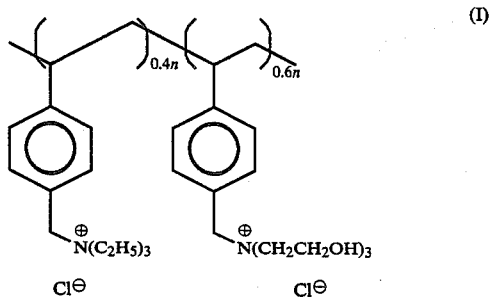

(I)

where n is the number of recurring units per molecule of ionomer, to provide a cationic film which incorporates tetrasulfonated zinc tetraphenylporphyrin at cationic sites with the polyvinylpyridine or copolymer of vinylpyridine with styrene being available for coordination. A photocatalyst with such a polymer film is effective for the oxidative degradation of $Fe(CN)_6^{-3}$ without the release of free cyanide at wavelengths of 300-400 nm.

BRIEF DESCRIPTION OF THE DRAWINGS

Further features and advantages of the invention will become more readily apparent from the following non-limiting examples and the accompanying drawings, in which.

DESCRIPTION OF PREFERRED EMBODIMENTS

Example 1

Figure 1:
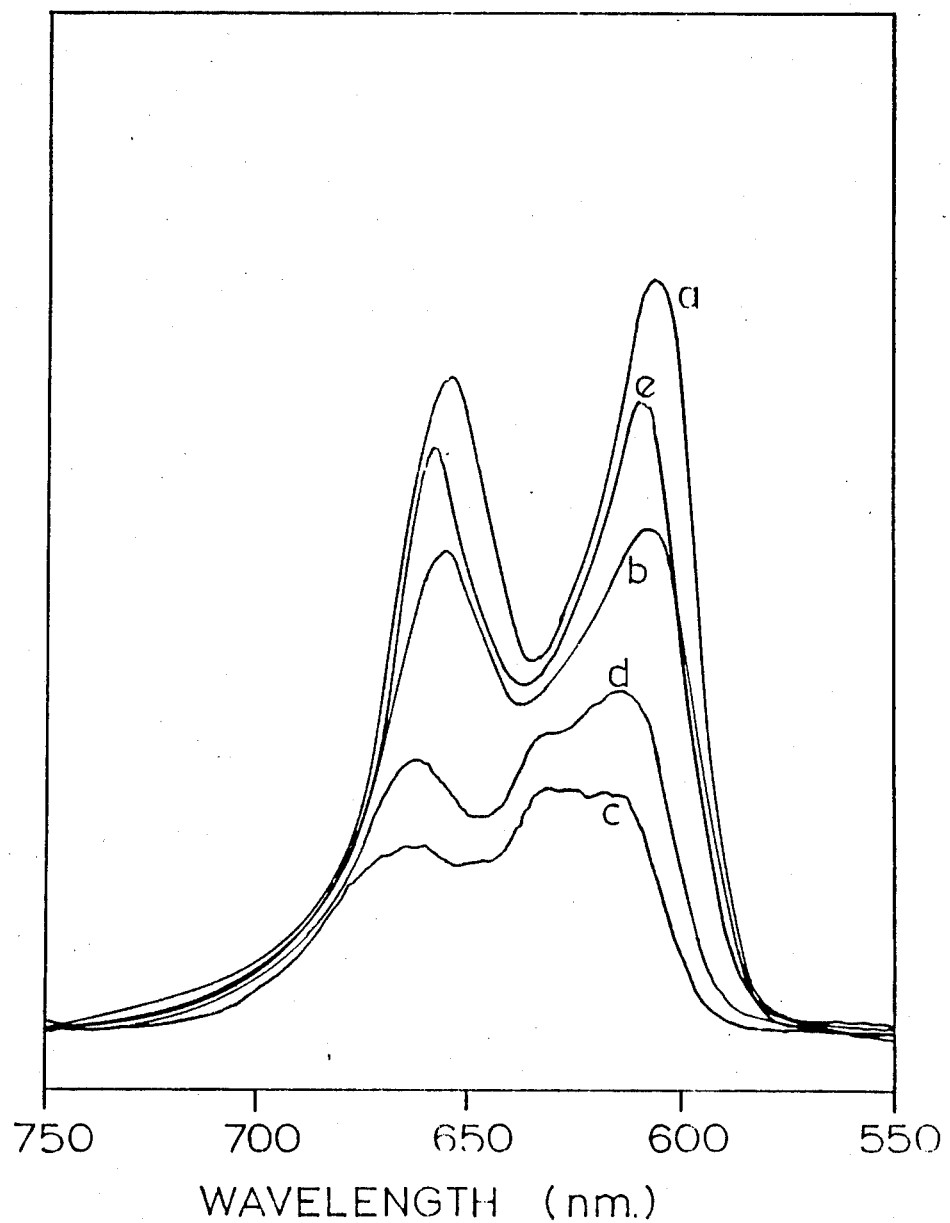
FIG. 1 represents the fluorescence spectra of the titration of zinc tetraphenylporphyrin sulfonate in methanol with increments of a 1% polyvinylpyridine solution.

A solution of polyvinylpyridine (PVP) copolymerised with 10% polystyrene was prepared by dissolving 104 mg of the polymer in 100 ml of $ChCl_3$. To this solution, 24 mg of zinc tetraphenylporphyrin (ZnTPP) was added. Preparation of the photocatalyst was accomplished by dispersing 100 mg of 10 u size titanium dioxide ($TiO_2$) particles into 5 ml of the prepared ZnTPP/PVP solution along with 25 ml of $CH_2Cl_2$ and sonicating for 24 hours in a Petri dish. The final product was of a greenish colour.

Example 2

The procedure of Example 1 was repeated, except that the ZnTPP was replaced by palladium tetraphenylporphyrin (PdTPP). A composite photocalyst comprising particles of $TiO_2$ coated with a PdTPP/PVP film was obtained, having a similar greenish colour.

Example 3

The procedure of Example 1 was repeated, except that the ZnTPP was replaced by magnesium tetraphenyporphyrin (PdTPP). A composite photocatalyst comprising particles of $TiO_2$ coated with a PdTPP/PVP film was obtained, having a similar greenish colour.

Example 4

Three types of substrates, namely o-dichorobenzene, an AROCLOR sample and 2,2',3,3',4,4',6-heptachlorobiphenyl isomers (HCB), were used to evaluate the effectiveness of the photocatalyst obtained in Example 1 as compared with $TiO_2$ alone. The o-dichlorobenzene used was reagent grade and found to have a single sharp peak in the gas chromatogram (retention time was 2.38 minutes at 140° C.). AROCLOR pesticide samples were gas chromatography standards supplied by Chromatographic Specialities Limited and were used without further purifications. 2,2',3,3', 4,4',6-heptachlorobiphenyl monomers were supplied by RFR Corporation and found to have a single peak in the gas chromatogram (retention time 26.20 minutes at 180° C.).

A stock solution of o-dichlorobenzene in hexane was prepared. The concentration was 168.36 ppm. The AROCLOR pesticides stock in hexane as supplied was 100 ppm. The stock solution prepared of 2,2',3,3',4,4',6-heptachlorobiphenyl in hexane was 74.70 ppm in concentration.

Photolysis of each sample was generally performed according to the following procedure. A portion of 0.03 g of the prepared catalyst was weighed into a 50 ml conical Pyrex flask. This was followed by 10 ml of distilled and deionized water. The organic phase was made up of 1 ml of the substrate stock plus 5 ml of hexane (in experiments involving paraffin, the 5 ml of hexane was replaced with 5 ml of paraffin). The conical flask was then assembled with a condenser that was stoppered at the top. The final assembly was a closed system. The thermostated cell was fabricated in Pyrex with a collapsed and flattened area which served as the window for irradiation. The light source in all the experiments was a Xenon lamp unit supplied by Photochemical Research Associates Inc. with a 150 W XBO lamp. The duration of irradiation was generally 3 hours unless specified otherwise. The sample solution was stirred with a magnetic stirrer continually during irradiation. Another 5 ml of hexane was added to the organic phase after the irradiation was over. A 2 ml aliquot was carefully pipetted from the organic phase and further diluted with 25 ml of hexane before it was subjected to gas chromatographic analysis. A control in the dark was prepared in exactly the same manner and left to equilibrate under stirring for 3 hours. All the hexanes used were of pesticide grade.

The column used in the gas chromatography (GC) was 2% OV +3% QF. Carrier gas was 5% methane +95% argon at a flow rate of 60 ml/minute. The column was either programmed at 180° C. or 200° C. The detector for th GC was an electron capture detector (ECD) at 180° C., the parent peak of HCB referred to hereinbelow appeared at approximately 19 minutes. The intermediate peak referred to appeared at approximately 12 minutes and at 200° C., at approximately 10 minutes. Finally, the short retention time peak referred to appeared at approximately 5.5 minutes while at 200° C., the same peak appeared at approximately 5 minutes.

Preliminary experiments evaluated the effectiveness of $TiO_2$ alone. The standard aqueous slurry was 10 ml of distilled water hexane or paraffin oil (1 ml hexane stock plus 5 ml diluent).

Four hours of irradiation of o-dichlorobenzene in paraffin oil resulted in 34% loss of the dichlorobenzene GC peak as opposed to zero loss from samples irradiated without $TiO_2$ or dark controls. A parallel experiment employing AROCLOR 1016 revealed very little degradation. The same system in hexane yielded no significant increase of photodegradation. Thus, $TiO_2$ alone is very much less efficient when the substrate is in an organic phase than has been reported in the literature for aqueous experiments.

With this result in hand, the $TiO_2$ was replaced with the same weight of the composite photocatalyst ZnTPP/PVP/$TiO_2$ obtained in Example 1. On irradiation of the AROCLOR 1016 mixture, there were decreases in all GC peaks associated with component PCB's. Some decreased by as much as 54% in three hours. A solution of the pure isomer, HCB, in hexane could be photodegraded with zero order kinetics over a period of about four hours. GC results indicate the loss 95% of all species which have well defined retention times and are detectable with the ECD. Addition of $AgNO_3$ to the aqueous phase indicates a release of approximately stoichiometric amounts of chloride ion. In the course of the degradation, intermediate retention time peaks are seen which are assignable as partially dechlorinated PCB's. HCB was used to study the reaction in more detail.

The conditions just described utilize white light containing 300-400 nm UV, visible light and IR which raised the temperature to approximately 40° C. Thermostating the reaction vessel to 25° C. greatly reduced the rate of the reaction, but there was no detectable thermal reaction in the dark at 40° C. Similarly, the use of a 410 nm cutoff filter reduced the rate of reaction to an unobservably small value. When the heavy paraffin oil was substituted for hexane as the solvent for HCB, the rate dropped by a factor of approximately two and the four hour conversion was 50%.

Example 5

Carrying out the irradiation test described in Example 4, but using instead the composite photocatalyst PdTPP/PVP/$TiO_2$ obtained in Example 2, gave equivalent results.

Example 6

Carrying out the irradiation test set forth in Example 4, but using instead the composite photocatalyst MgTPP/PVP/$TiO_2$ obtained in Example 3, provided a 35% reduction in reaction rate as compared with the photocatalyst ZnTPP/PVP/$TiO_2$.

Example 7

1. Preparation of cationic ionomer.

A 100 ml solution of benzene containing 3.166 g of styrene, 18.374 g of chloromethylstyrene and 0.5188 g of 2,2'-azobis(isobutyronitrile) (AIBN) was degassed with nitrogen. The polymerisation process was then allowed to proceed for 24 hours under a blanket of nitrogen. The random copolymer was precipitated from n-hexane to remove unreacted monomers. The precipitate was then redissolved in 100 ml benzene and 13 ml of triethylamine was added.

The resulting solution was refluxed for 1½ hours at 80 C and then allowed to cool. 10 ml of triethanolamine was then added and refluxing was allowed to continue for an additional 90 min. The resulting copolymer was then precipitate by isopropanol and the light-yellow polymer was dried under vacuum at 30 C for 24 hours. 2 grams of this polymer which has the formula (I) defined hereinabove (hereinafter referred to as ionomer (I)), was dissolved n 100 ml of methanol to give a working solution of effectively 2% ionomer (I).

2. Preparation of poly(4-vinylpyridine) (PVP) solution

A 2% solution of PVP was prepared in methanol by dissolving 2 g of PVP (10% costyrene) in 100 ml of methanol.

3. Preparation of tetrasulfonated porphyrin dye 0.7 g of tetrasodium-mesotetra(4-sulfonatophenyl) porphine(12-hydrate) ($TPPS^{-4}$) was refluxed with Zn metal (which was etched with HCl and washed thoroughly with distilled water) in distilled water for 24 hours. After cooling, the solution was decanted from the excess Zn metal, the water evaporated, and the dried product stored under vacuum at 60° C. for 24 hours. UV-Visible spectra of the dissolved dye ($ZnTPPS^{-4}$) show complete conversion of TPPS to ZnTPPS.

4. Preparation of dye-polymer blend (casting solution)

53.92 mg of $ZnTPPS^{-4}$ dissolved in 10 ml of methanol was added to 10 ml of 2% PVP in methanol and 10 ml of 2% ionomer (I) in methanol. This solution gave an effective concentration of 165 mM $ZnTPPA^{-4}$, 0.67% PVP and 0.67% ionomer in methanol.

5. Preparation of composite photocatalyst

The semiconductor powders $TiO_2$, CdS and CdSe were coated in the following way. 1.0 g of semiconducting powder was added to a beaker containing 5 ml of the casting solution and 50 ml of methanol. These suspensions were sonicated to dryness (usually for 3-4 hours). Sonication allows equal dispersion of the semiconducting particles in the polymer-dye solutions. The effective loading of the semiconducting particles with dye is about 0.75-0.85% (w/w). The dried catalysts which adhere to the sides of the beaker were scrapped off with a spatula. The physical appearance of the particulate catalysts ranges from green-yellow for the coated $TiO_2$ to yellow for the coated CdS. Further drying of the catalyst took place in a vacuum oven at 30° C. for 24 hours.

Example 8

The three composite photocatalysts obtained in Example 7 were irradiated as 0.2% slurries in a 100 ml three-necked round bottom flask. The solution was a 75 ppm $K_3Fe(CN)_6$ in 0.1 M NaOH. The irradiation source was a 75 watt Xe lamp and the light beam was passed through a 5 cm water filter to remove IR and a 400 nm cutoff filter to remove UV light, respectively. The incident radiation at the focal point inside the solution slurry was 200 mW/cm$^2$ (Coherent power meter). The flask was equipped with a water condenser and the slurry was stirred continuously during irradiation.

The reaction was monitored in two ways:

(i) Measuring the absorption at 300 nm for the disappearance of $K_3Fe(CN)_6$.

(ii) Measuring the absorption at 578 nm for the appearance of $CN^-$ (by the standard ASTM colorimetric method for $CN^-$ determination).

1.5 ml samples were taken at different time intervals with a syringe. The samples were filtered through a no. 1 Whatman filter paper to remove the catalyst and then testing proceeded.

All three coated catalysts were compared to the corresponding bare semiconductor particles. In all cases, degradation was observed to be greater for the coated catalyst. Approximately 4 hours irradiation was required for complete degradation by coated $TiO_2$ or CdS. Coated CdSe completely degraded the ferricyanide in about 150 minutes. Kinetics are not simple. In no case was free cyanide detected as a degradation product. The extent of degradation of ferricyanide after 60 minutes is reported in the following table:

| Photocatalyst | Ferricyanide remaining after 60 mins. irradiation (ppm) |
|---|---|
| bare $TiO_2$ | 58 |
| coated $TiO_2$ | 37 |
| bare CdS | 43 |
| coated CdS | 24 |
| bare CdSe | 50 |
| coated CdSe | 31 |

As it is apparent from the table, the composite photocatalyst of the invention is significantly more effective than the corresponding bare semiconductor.

Example 9

The effect of "titrating" a 5 micromolar solution of zinc tetraphenylporphyrin sulfonate ($ZnTPPS^{-4}$) in $CH_3OH$ with aliquots of a 1% PVP solution in $CH_3OH$ is shown in FIG. 1. The fluorescence bands of the $ZnTPPS^{-4}$ is shown by curve (a). Curves (b), (c), (d) and (e) show the fluorescence after 5, 10, 50 μl and an excess of the PVP solution has been added. The fluorescence is first quenched (curves (b) and (c)) and after a certain concentration of polymer it recovers again (curves (d) and (e)). The quenching and recovery coincide with a decrease and a subsequent increase in the lifetime of the fluorescence. It is associated with the ability of the polymer to aggregate the $ZnTPPS^{-4}$ at low concentration, but as more polymer is added, there is a distribution of the $ZnTPPS^{-4}$ over separated polymer sites. Aggregation of the $ZnTPPS^{-4}$ decreases its fluorescence lifetime significantly. Thus, the zinc to pyridine ratio determines the photochemical behaviour of the photocatalyst, as it significantly affects the lifetime of the dye. The effect on lifetime explains the non-linear relation between dye loading and catalytic activity observed.

We claim:

1. A composite photocatalyst for refractory waster treatment, comprising platinum-free particles of a wide band gap semiconductor material selected from the group consisting of titanium dioxide, cadmium sulfide and cadmium selenide, said particles being coated with a polymer film capable of absorbing a refractory waste substance to be treated and comprising a pyridine-containing polymer and a divalent metal porphyrin or metal phthalocyanine-based dye, said dye being molecularly dispersed throughout said film and chemically bonded to said pyridine-containing polymer, with the proviso that when said semiconductor material is titanium dioxide, said pyridine-containing polymer is polyvinylpyridine or a copolymer of vinylpyridine with styrene and said dye is zinc tetraphenylporphyrin, the zinc tetraphenylporphyrin and polyvinylpyridine or copolymer of vinylpyridine with styrene are present in a zinc to pyridine mole ratio greater than 1:8, whereby upon mixing of said photocatalyst with said refractory waste substrate and irradiation with light having a wavelength of about 300 to about 400 nm, said photocatalyst generates in the polymer film thereof reactive species which are sufficiently oxidizing to degrade the refractory waste substrate absorbed in said polymer film.

2. A composite photocatalyst as claimed in claim 1, wherein said semiconductor material is titanium dioxide.

3. A composite photocatalyst as claimed in claim 1, wherein said pyridine-containing polymer is polyvinylpyridine or a copolymer of vinylpyridine with styrene.

4. A composite photocatalyst as claimed in claim 1, wherein said dye is a divalent metal porphyrin selected from the group consisting of zinc tetraphenylporphyrin, palladium tetraphenylporphyrin and magnesium tetraphenylporphyrin.

5. A composite photocatalyst as claimed in claim 1, wherein said dye is copper phthalocyanine.

6. A composite photocatalyst as claimed in claim 1, wherein said polymer film comprises zinc tetraphenylporphyrin and polyvinylpyridine or a copolymer of vinylpyridine with styrene in a zinc to pyridine mole ratio of about 1:6.

7. A composite photocatalyst as claimed in claim 1, wherein said polymer film comprises polyvinylpyridine or a copolymer of vinylpyridine with styrene blended with a cationic ionomer to provide a film having cationic sites, said film incorporating tetrasulfonated zinc tetraphenylporphyrin at the cationic sites thereof.

8. A composite photocatalyst as claimed in claim 1, wherein said particles of semiconductor material have a size of about 1 to 10μ.

9. A composite photocatalyst as claimed in claim 1, wherein said polymer film has a thickness of about 0.5 to about 2μ.

* * * * *